S. R. BAILEY.
BELT SHIFTER.
APPLICATION FILED JUNE 22, 1908.
1,022,650.
Patented Apr. 9, 1912.
2 SHEETS—SHEET 1.
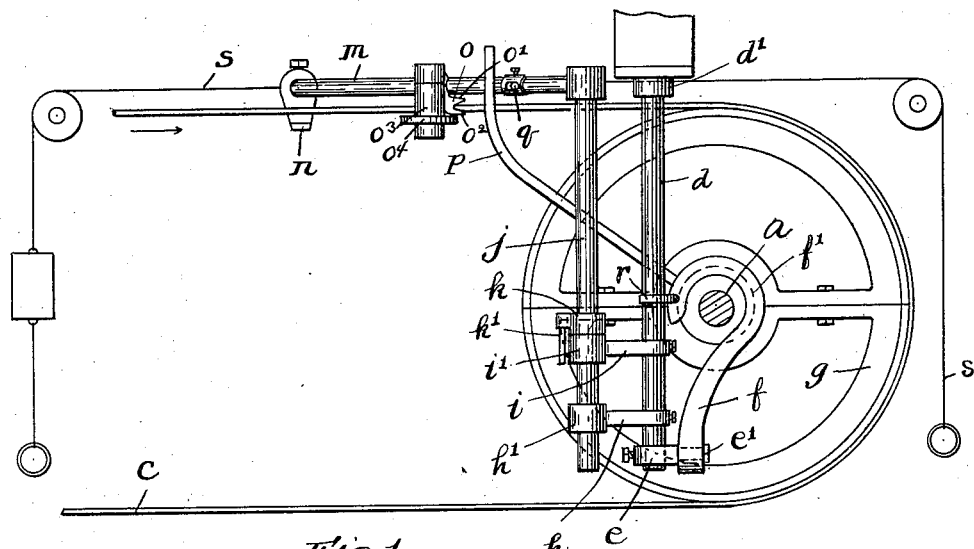
Fig. 1.
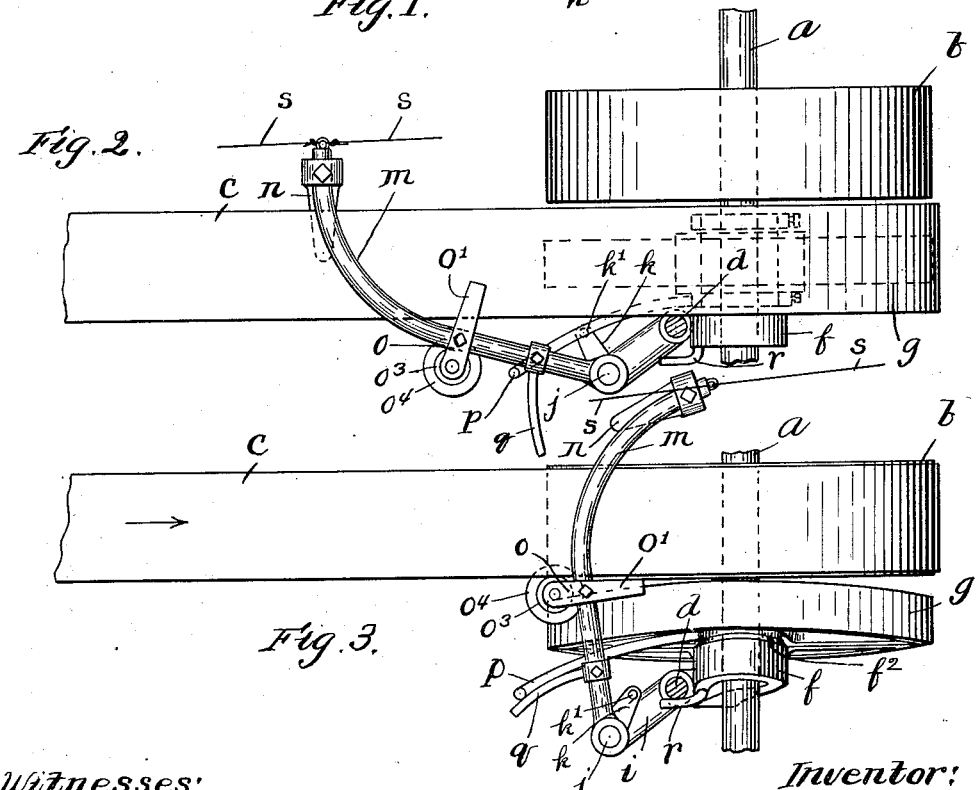
Fig. 2.
Fig. 3.
Witnesses:
H. B. Davis.
Cynthia Doyle.
Inventor:
Sam'l R. Bailey
by August Hamman
Att'ys

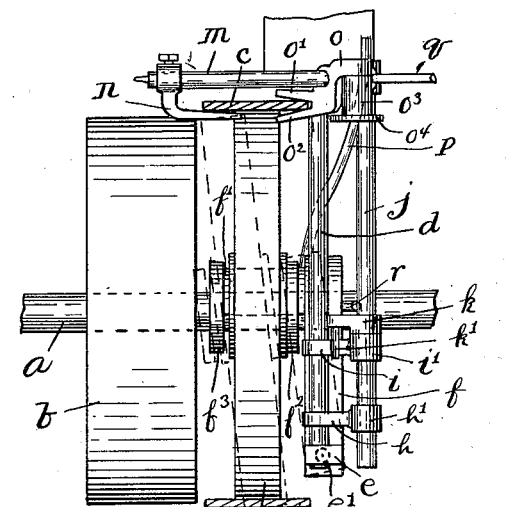

UNITED STATES PATENT OFFICE.

SAMUEL R. BAILEY, OF AMESBURY, MASSACHUSETTS.

BELT-SHIFTER.

1,022,650.  Specification of Letters Patent.  Patented Apr. 9, 1912.

Application filed June 22, 1908. Serial No. 439,674.

*To all whom it may concern:*

Be it known that I, SAMUEL R. BAILEY, of Amesbury, county of Essex, State of Massachusetts, have invented an Improvement in Belt-Shifters, of which the following is a specification.

This invention relates to certain improvements in belt shifters of the character shown in my prior Patents #818,654, #818,931, and #867,466, in which an idle pulley is mounted on a bearing supported independently of the main shaft and is moved to carry the edge-portion of the belt into engagement with a fast pulley on the shaft. In a device of this character certain difficulty has been experienced in transferring the belt from the loose to the fast pulley when the load to be started was especially heavy, and, in such instances, the frictional engagement with the portion of the belt which is carried onto the fast pulley, by the devices of said prior patents, is often insufficient to start the belt, so that, in order to run the belt onto the pulley, it is necessary to assist the fast pulley in starting the belt, or place or force a sufficient portion of the belt into engagement with the fast pulley to enable it to start the belt. In the devices of my said prior patents, the engaging means for the edge of the belt, which acted to force the belt onto the fast pulley, moved transversely of the belt, the shipper lever, when provided with means for engaging the opposite edge of the belt from the fast pulley, acting only to guide the belt onto the middle of the fast pulley after it had been started by the latter. The action of said engaging means in pressing against the edge of the belt causes a strong frictional engagement therebetween, which acts, to a very material extent, to place, in effect, an added load upon the belt, which is nearly, if not quite as great as the inertia of the parts which must be overcome.

I have observed that a longitudinal pull on the belt, of sufficient force even to overcome only partly the inertia of the parts, will usually be sufficient to enable the fast pulley to move the belt, which, as soon as it is even started, will immediately run upon the fast pulley without further assistance.

It will be apparent that the strain and wear upon the edge portion of the belt next the fast pulley will be lessened by means which increase the width of the portion of the belt which is placed on the fast pulley at the time the frictional engagement between the belt and pulley first takes place, and that the force with which the belt is engaged will be correspondingly increased.

Inasmuch as, in practice, belts from counter-shafts run onto the main shaft pulley at various points and angles with relation to the ceiling on which the loose pulley hanger must usually be supported, it follows that it is desirable, in a commercial device of this character, that it be capable of use, or be constructed for adjustment for use in all the different conditions which are likely to be required.

The objects of my invention are to provide an apparatus of the above described character, with means which not only will not act to increase the force required to start the belt forwardly while it is being moved transversely, to transfer it from the loose to the fast pulley, but which will actually assist the fast pulley in starting the belt to an appreciable extent.

A further object of my invention is to provide means for so moving the loose pulley toward the fast pulley, as to cause a large portion of the width of the belt to be laid on the fast pulley at the time the two are first brought into engagement.

Further objects of my invention are to simplify these devices so that they may be manufactured at less expense than previously, and which may be readily adjusted to suit the varying conditions under which devices of this character may be used.

I accomplish these objects by the means shown in the accompanying drawing, in which,—

Figure 1 is an end elevation of a belt shifting apparatus made according to my invention. Figs. 2 and 3 are plan views, respectively, showing the parts in the inoperative and operative positions. Fig. 4 is a front elevation. Fig. 5 is a detail view of a preferred form of belt engaging device. Fig. 6 is an end elevation showing the parts adjusted for a different position of the counter shaft with relation to the main shaft. Figs. 7, 8 and 9 are detail views of modified forms of the means for adjusting the shipper arm and loose pulley holding devices. Fig. 10 is a detail view illustrating the action of the loose pulley in placing the belt on the fast pulley, and Fig. 11 is a detail view of a modified form of belt engaging finger.

In the drawing $a$ indicates the main shaft having the fast pulley $b$ mounted thereon, over which the belt $c$ is adapted to run from a counter shaft, not shown, in the direction of the arrow in Fig. 1.

According to my present invention, a supporting bar $d$, which is preferably made in the form of a round rod of sufficient strength to support the apparatus rigidly, is mounted at its upper end in a socket plate $d'$, the latter, in practice, being usually secured to the ceiling of the building. Where the belt leads onto the upper side of the pulley in an approximately horizontal direction, the construction shown in Figs. 1 to 4 is preferably employed and in such construction the bar $d$ is preferably straight from end to end and is supported in a perpendicular position.

A sleeve $e$ is adapted to be adjustably secured to the lower end of the bar $d$, and said sleeve is provided with a horizontally disposed pivot $e'$ on which a hanger $f$ is pivotally mounted at its lower end. Said hanger extends upwardly and is provided with a curved upper end portion, from the side of which a bearing $f'$ projects, and on which the loose pulley $g$ is journaled between axially adjustable stop rings $f^2$, $f^3$, arranged to permit a limited axial movement of the pulley $g$ on said bearing. The face of said pulley $g$ is much narrower than the belt $c$, and in practice approximately half the width thereof, and said pulley $g$ and rings $f^2$, $f^3$ are split to enable them to be placed on the shaft. The curved portion of the hanger and its projecting bearing $f'$, are open at their under sides, so that the hanger may be readily placed in position about the shaft. Said sleeve $e$ is so adjusted that the axis of the loose pulley is a short distance above the axis of the shaft, the diameters of both pulleys being approximately the same.

The vertical bar $d$ is so arranged with relation to the face of the loose pulley that it will act as a stop for the belt, when it is run thereon from the fast pulley, so that the opposite portion of the belt will extend beyond the face of the loose pulley, a distance equal approximately one-third its width when the belt comes to rest.

The pivot $e'$, upon which the hanger $f$ is mounted, is arranged beneath the shaft $a$ at the opposite side of the loose pulley from the fast pulley, and at a distance from the shaft somewhat less than the radius of the loose pulley, so that, when the hanger is swung on said pivot, the loose pulley will be swung down as it is moved transversely, and, as it moves toward the fast pulley, it will lay nearly the entire portion of the belt which projects beyond the loose pulley's face upon the face of the fast pulley, as shown in Fig. 10, and the dotted position of Fig. 4, the necessity of pushing the belt over the face of the fast pulley, as in my prior devices, being thereby avoided.

While the tipping movement of the loose pulley may be sufficient to transfer the belt, yet, under some conditions it is desirable to have the pulley slide axially to a limited extent on its bearing. For this reason I provide the adjustable stops $f^2$, $f^3$, so that the axial movement of the loose pulley may be limited to the desired extent.

A pair of brackets $h$ and $i$ are adjustably mounted upon the bar $d$, and a rod $j$ is rotatably mounted in bearings $h'$ and $i'$ formed in the ends of said brackets $h$ and $i$, said rod $j$ being held in a position parallel with the bar $d$ and being supported in said bearings by a stop sleeve $k$ having a depending finger $k'$ thereon, which is adapted to engage the bracket $i$ when the rod $j$ is turned to a certain position, to limit the rotation thereof in one direction. A shipper arm $m$ is adjustably secured by means of a set-screw, or other suitable means, to the upper end portion of the rod $j$, said arm having a straight portion adjacent the rod $j$, which extends at right angles thereto, and being curved at its middle portion through nearly 90 degrees, the extreme end portion of said arm having a belt-engaging finger $n$ mounted thereon, and the intermediate portion having a belt-engaging fork $o$ mounted thereon closely adjacent the point where the arm is curved. The arms $h$ and $i$ are horizontally adjusted, about the bar $d$ as a pivot, so as to hold the rod $j$ at a distance from the shaft $a$, somewhat less than the radius of the pulley, and at a slightly greater distance from the edge of the face of the loose pulley than the rod $d$. With the parts thus adjusted, when the belt is at rest on the loose pulley, the shipper arm $m$ extends for a distance in the direction from which the belt leads, and then obliquely across the belt, the finger $n$ at its end extending beneath the belt in a direction nearly at right angles thereto, see Fig. 2.

As best shown in Fig. 5, the belt-engaging fork $o$ comprises a pair of diverging arms $o'$, $o^2$, which extend above and below the sides of the belt, and at right angles thereto, when the belt is in its "dead" position, and providing therebetween belt-engaging faces which converge to such an extent that the space therebetween is of less width than the thickness of the belt. Said fork $o$ may also be provided with a roller $o^3$, which is mounted to rotate thereon about an axis perpendicular to the shipper arm and in the plane of the fingers $o'$, $o^2$, and said roller is provided with a belt supporting flange $o^4$ at its lower end.

An arm $p$ is rigidly mounted in the hanger $f$ and extends upwardly and forwardly above the level of the belt, at the opposite side of the shipper arm $m$ from the belt, and a finger $q$ is adjustably secured on the arm $m$, in position to engage the arm $p$, as the arm $m$ is moved to shift the belt onto the fast pulley, see Fig. 3.

A stop arm $r$ is mounted in the hanger in position to engage the rod $d$ and to limit the forwardly tilting movement of the hanger, the finger $k'$ on rod $j$ limiting the forward swinging movement of arm $m$, by engaging the bracket $i$.

Suitable operating ropes $s$ are connected to the extreme end of the shipper arm $m$, by means of which said arm may be swung in opposite directions. Both ropes may be fastened to hold the loose pulley in the position into which it is moved, or in case the belt runs on the pulleys as in Fig. 1, the cord which holds the pulley in its upright position is preferably weighted.

As the belt engaging fingers $o'$, $o^2$ extend approximately perpendicularly to the belt and at opposite sides thereof, when the lever $m$ is pulled to swing the same across the belt, the edge portion of the belt will become wedged between said fingers and will be firmly engaged thereby. As the arm is swung about the axis of the rod $j$, as a center, the fork $o$ will not only be moved transversely of the belt to press it toward the fast pulley, but it will also be moved longitudinally of the belt, toward the fast pulley, thus pulling on the belt in a direction to start it. As there is a strong frictional engagement between the fingers $o'$, $o^2$ and the belt, obviously the greater the force applied to the shifting cord $s$, the greater the pull upon the belt.

The pressure of the fork $o$ against the belt will act to cause the loose pulley to tilt toward the fast pulley upon the pivot $e'$, lowering the projecting edge portion of the belt down upon the face of the fast pulley, as shown in Fig. 10. As the fork $o$ will be acting to pull upon the belt at one side at the time the fast pulley is pulling on the belt at the other side, the united action will start the belt, and once started, it will at once run, or be guided onto the middle of the fast pulley. It is not the intention to have the fingers $o'$, $o^2$, engage the belt so firmly as to prevent any slip whatever therebetween, the engagement being frictional rather than positive, but nevertheless being capable of exerting a strong pull thereon. If the belt is started so that it is caused to move faster than the fork is being moved by the shipper, the belt will merely act to draw along the fork with it, swinging the arm in until the fingers become disengaged therefrom, said fingers being turned to a position parallel to the belt as the arm $m$ is moved to a position in which its straight portion is perpendicular to the belt, in which position the fingers will be wholly disengaged from the belt, and will lie parallel thereto, as shown in Fig. 3. As shown in this figure the roll $o^3$ on the clip extends beyond the sides of the fingers and, when in said position, acts to prevent the edge of the belt from rubbing against the fingers. The roll $o^3$ may also act to force the belt from between the fingers during the latter part of the movement, in case the necessity of such action should arise.

It will be observed that, whatever the extent to which the longitudinal movement of the fork $o$ may assist the fast pulley $b$ in starting the belt, under no condition is there any tendency to retard such movement, and, in case where the load to be started is not especially heavy, I preferably employ a simple form of belt engaging finger, similar to the finger $n$, and such as the finger $t$ shown in Fig. 11. When the finger $t$ is used, there is a sufficiently strong frictional engagement between the same and the belt to enable the belt to be readily started under ordinary conditions.

In order to insure the tipping movement of the loose pulley toward the fast pulley at the desired time, in case the transverse pressure on the belt be insufficient to perform this function, the finger $q$ is adjusted on the arm $m$ in position to engage the arm $p$ on the hanger and to move the hanger positively on its pivot at the desired time. Said finger $q$, is however, ordinarily unnecessary when the parts are used in the position shown in Figs. 1 to 4, but is necessary when they are used in such a position that the loose pulley would swing by gravity away from the fast pulley, and would not therefore be in position to receive the belt when it was run off the fast pulley. Such a position would be one in which the position of the belt engaging parts would be inverted, as would be necessary in case the belt run in the opposite direction from that shown in Fig. 1.

In transferring the belt back onto the loose pulley the cord will be pulled so as to swing back the arm $m$ to the initial position, and, as it moves, the finger $n$ will engage and cause it to run onto the loose pulley. As the arm $m$ is moved back it will engage the arm $p$ by the time the belt is well started upon the loose pulley, so that, during the remainder of the movement, the loose pulley will be swung back to its vertical position.

In case the belt leads onto the under side of the pulley in a horizontal direction, the position of the belt engaging devices on the supporting bar $d$ must be reversed. That is, the sleeve $i$ will be secured to the upper end of said bar, so that the hanger will be inverted and the shipper arm $m$ will be supported at the lower end of the rod $j$.

In order that the device may be employed in cases where the belt runs onto the fast pulley at various intermediate angles, or in directions oblique to the ceiling, I provide means for adjusting the lower portion of the bar $d$, so that such portion is approximately perpendicular to the belt as it leads onto the pulley, the shaft $j$ being thus held in parallel to such portion and the parts connected thereto being correspondingly moved, as shown in Fig. 6. Such adjustment may be accomplished in various ways, as by providing the bar $d$ of material which may be bent, as shown at $d^{10}$ in Fig. 7, or by forming it in two sections, $d^2$, $d^3$, and providing circular adjusting plates $u$, $u'$ on their ends connected by a clamping bolt $v$, as shown in Figs. 8 and 9, or by providing elbows $x$ of different angles which may be connected to the two sections $d^4$ and $d^5$, as shown in Fig. 6, the parts otherwise being the same as before described.

Having thus described my invention, what I claim as new and desire to secure by Letters Patent is:—

1. In combination with a fast pulley, a loose pulley supported at one side thereof, a belt adapted to be driven by the fast pulley, means for holding the belt on the loose pulley with one of its edge portions projecting beyond the face thereof toward the fast pulley, means for moving the loose pulley to carry said projecting edge into engagement with the fast pulley, and a belt-engaging device movable obliquely of the belt toward the fast pulley to assist the same in starting the belt as it is brought into engagement therewith and thereafter to guide the belt onto the middle portion thereof, substantially as described.

2. In combination with a fast pulley, a loose pulley supported at one side thereof, a belt adapted to be driven by the fast pulley, means for holding the belt on the loose pulley with one of its edge portions projecting beyond the face thereof toward the fast pulley, means for moving the loose pulley to carry said projecting edge into engagement with the fast pulley, and a belt-engaging device movable longitudinally of the belt in frictional engagement with the opposite edge portion to draw the same toward the fast pulley as the first named edge portion is brought into engagement with the fast pulley, whereby said engaging device and said fast pulley may act simultaneously to start the belt, substantially as described.

3. In combination with a fast pulley, a loose pulley supported at one side thereof, a belt adapted to be driven by the fast pulley, an arm, pivotally mounted adjacent the opposite side of the loose pulley from the fast pulley, and movable to swing approximately in the plane of the belt from a position in which it extends toward the direction from which the belt normally travels to a position transverse thereof, and a belt-engaging device mounted on said arm comprising a pair of diverging fingers extending approximately at right angles to said arm and between which the edge portion of the belt is adapted to be wedged, substantially as described.

4. In combination with a fast pulley, a loose pulley supported at one side thereof, a belt adapted to be driven by the fast pulley, a pivotal support adjacent the opposite side of the loose pulley from the fast pulley, an arm mounted on said support and extending, when in its initial position, longitudinally of the belt oppositely to the direction of movement of the belt and transversely thereof and a pair of belt-engaging fingers, one mounted on said arm adjacent the end of said longitudinally extending portion and the other at the extreme end thereof, said fingers extending at the opposite side of the belt from said arm at its opposite edges and in opposite directions, substantially as described.

5. In combination with a fast pulley and a belt adapted to be driven thereby, a support at one side of said pulley, a hanger pivotally mounted on said support to swing toward and from said pulley, and a loose pulley mounted on said hanger, said support being constructed for adjustment in a plane parallel to said fast pulley to hold said hanger to swing about an axis approximately parallel to the belt as it leads onto the pulley, substantially as described.

6. In combination with a fast pulley and a belt adapted to be driven thereby, an overhead support having a depending arm connected thereto, said arm having its lower portion constructed for adjustment in a plane parallel to said pulley, a hanger pivotally mounted, and a rod rotatably mounted on said lower portion of said arm, and so disposed that their axes are approximately at right angles to each other, a loose pulley rotatably mounted on said hanger at one side of said fast pulley, and a shipper arm mounted on said rod approximately at right angles thereto, said arm having a belt-engaging device adapted to press the belt toward the fast pulley, substantially as described.

7. In combination with a fast pulley, and a belt adapted to be driven thereby, a hanger pivotally supported at one side of said pulley to swing toward and from the same and having a transverse hub, a loose pulley rotatable and axially movable on said hub, said hub having means for limiting said axial movement thereon, whereby said loose pulley may transversely swing and axially move toward the fast pulley to carry the belt into engagement therewith, substantially as described.

8. In combination with a fast pulley, and a pivotally supported hanger, a loose pulley rotatable thereon at one side of said fast pulley, and adapted to swing with the hanger toward and from the same, a shipper arm pivotally mounted adjacent said loose pulley to swing into engagement with the opposite edge-portion of the belt from the fast pulley to move the same toward the fast pulley, and a finger mounted on said hanger and extending in position to be engaged by said arm to hold the loose pulley obliquely inclined toward the fast pulley and in position to receive the belt therefrom, substantially as described.

9. In combination with a fast pulley, and a pivotally supported hanger, a loose pulley rotatable thereon at one side of said fast pulley, and adapted to swing with the hanger toward and from the same, a shipper arm pivotally mounted adjacent said loose pulley to swing into engagement with the opposite edge-portion of the belt from the fast pulley to move the same toward the fast pulley, a finger mounted on said hanger and extending at the opposite side of said arm from the fast pulley in position to be engaged by said arm, as it is moved to shift the belt onto the loose pulley, and to be moved to tilt the loose pulley into its vertical position, substantially as described.

10. In combination with a fast pulley and a belt driven thereby, a loose pulley, a hanger on which said loose pulley is mounted at one side of said fast pulley, means whereby the belt may be held on said loose pulley with its edge portion next the fast pulley projecting beyond the face thereof, a pivot extending approximately parallel to the leading-on portion of the belt and on which said hanger is mounted to swing the loose pulley toward and from the fast pulley to carry said projecting edge portion of the belt into engagement with the fast pulley, and a support for said pivot constructed to permit transverse adjustment of the pivot, substantially as described.

11. In combination with a fast pulley and a belt driven thereby, a supporting rod extending aproximately at right angles to the leading-on portion of the belt, a sleeve mounted on said rod and constructed for adjustment longitudinally thereof, a pivot mounted in said sleeve at right angles to said rod, a hanger mounted on said pivot to swing toward and from the fast pulley and a loose pulley journaled thereon in position to support the belt and to deliver the same to the fast pulley when the hanger is swung on said pivot, substantially as described.

In testimony whereof, I have signed my name to this specification, in the presence of two subscribing witnesses.

SAMUEL R. BAILEY.

Witnesses:
L. H. HARRIMAN,
A. W. REDDY.

Copies of this patent may be obtained for five cents each, by addressing the "Commissioner of Patents, Washington, D. C."